US008818962B2

(12) United States Patent (10) Patent No.: US 8,818,962 B2
Mandagere et al. (45) Date of Patent: Aug. 26, 2014

(54) PROACTIVE DETECTION OF DATA INCONSISTENCIES IN A STORAGE SYSTEM POINT-IN-TIME COPY OF DATA

(75) Inventors: Nagapramod S. Mandagere, San Jose, CA (US); Ramani R. Routray, San Jose, CA (US); Sandeep M. Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 12/788,026

(22) Filed: May 26, 2010

(65) Prior Publication Data

US 2011/0295815 A1 Dec. 1, 2011

(51) Int. Cl.
*G06F 17/00* (2006.01)
*G06F 17/30* (2006.01)

(52) U.S. Cl.
USPC ........................................................ 707/690

(58) Field of Classification Search
None
See application file for complete search history.

(56) References Cited

U.S. PATENT DOCUMENTS

| 6,199,178 | B1 | 3/2001 | Schneider et al. | |
|---|---|---|---|---|
| 6,647,512 | B1 | 11/2003 | James et al. | |
| 6,732,293 | B1 | 5/2004 | Schneider | |
| 7,328,366 | B2 | 2/2008 | Michelman | |
| 2003/0005120 | A1* | 1/2003 | Mutalik et al. | 709/225 |
| 2006/0053347 | A1* | 3/2006 | van Ingen et al. | 714/47 |
| 2007/0038895 | A1 | 2/2007 | Biegert et al. | |
| 2008/0282111 | A1* | 11/2008 | Li et al. | 714/38 |
| 2011/0099146 | A1* | 4/2011 | McAlister et al. | 707/634 |
| 2011/0153568 | A1* | 6/2011 | Shang et al. | 707/648 |
| 2012/0130960 | A1* | 5/2012 | Nerger | 707/690 |

OTHER PUBLICATIONS

Corner, Mark D. et al., "Zero-Interaction Authentication", MOBICOM '02, Sep. 23-28, 2002, ACM 1-58113-486-X/02/0009, pp. 1-11.
Corner, Mark D. et al., "Protecting File Systems with Transient Authentication", Wireless Networks 11, pp. 7-19, 2005.
Wang, H.J. et al., "Automatic Misconfiguration Troubleshooting with PeerPressure", OSDI '04: 6th Symposium on Operating Systems Design and Implementation, Berkeley, CA, USA: USENIX Assoc., 2004, pp. 245-257.
Lao, N. et al., "Combining High Level Symptom Descriptions and Low Level State Information for Configuration Fault Diagnosis", Proc. of the 18th Conference on System Administration, 2004 LISA XVIII, Nov. 14-19, 2004, Atlanta, GA, pp. 151-158.
Cohen, I. et al., "Capturing, Indexing, Clustering, and Retrieving System History", SOSP '05, Oct. 23-26, 2005, Brighton, ACM 2005, pp. 105-118.

(Continued)

*Primary Examiner* — Rehana Perveen
*Assistant Examiner* — Raheem Hoffler
(74) *Attorney, Agent, or Firm* — Mohammed Kashef (57) ABSTRACT

Embodiments of the invention relate to testing a storage system point-in-time copy of data for consistency. An aspect of the invention includes receiving system and application event information from systems and applications associated with point-in-time copies of data. The system and application event information is associated with each of point-in-time copies of data. At least one point-in-time copy of data is selected for testing. The system and application event information is compared with inconsistency classes to determine tests for testing the point-in-time copy of data. The point-in-time copy of data is tested.

10 Claims, 6 Drawing Sheets

(56) References Cited

OTHER PUBLICATIONS

Redstone, J.A. et al., "Using Cmputers to Diagnose Computer Problems", HotOS IX: The 9th Workshop on Hot Topics in Operating Systems, May 18-21, 2003, Lihue, HI, USA, pp. 91-96.

Uttamchandani, S. et al., "Chameleon: a self-evolving, fully-adaptive resource arbitrator for storage systems", 2005 USENIX Annual Technical Conference, ATEC '05, pp. 75-88.

Lumb, C.R. et al., "Facade: virtual storage devices with performance guarantees", 2nd USENIX Conference on File and Storage Technologies, FAST 2003, pp. 131-144.

Karlsson, M. et al., "Triage: Performance Isolation and Differentiation for Storage Systems", International Workshop on Quality of Service, IWQoS, 2004, pp. 67-74.

Chambliss, D.D. et al., "Performance virtualization for large-scale storage systems", Proceedings of the 22nd International Symposium on Reliable Distributed Systems, SRDS 2003, pp. 109-118.

\* cited by examiner

PROACTIVE DETECTION OF DATA INCONSISTENCIES IN A STORAGE SYSTEM POINT-IN-TIME COPY OF DATA

BACKGROUND

1. Field of the Invention

Embodiments of the invention relate to the field of enterprise storage systems. In particular, embodiments of the invention further relate to proactive detection of data inconsistencies in a storage system point-in-time copy of data.

2. Background of the Invention

Business critical enterprise applications suffer data loss or downtime from data failure events. Events such as logical or physical data corruption, failures of the storage controllers, disks, and other Storage Area Network (SAN) components, or a complete site failure may cause data loss or downtime. Data corruption is one of the most common causes of data loss and may be caused when a value of a data's variables are incorrect, deleted, or unreadable. Data corruption may be caused by human configuration errors, physical media or firmware errors, logical software bugs, and virus attacks or malicious worms. The physical media errors may be caused by hardware problems associated with storage, caching, controller firmware bugs, or multi-path drivers.

A point-in-time copy of data is a copy of the state of a storage device at a give point-in-time. Point-in-time copies of data are used to restore data stored on the storage device. The original copy of the data continues to be the primary copy of data, available without interruption, while the point-in-time copy is used to perform other functions. A point-in-time copy of a data volume may be a logical copy of the data volume where only the changed data blocks are maintained, also referred to as a snapshot. A point-in-time copy of a data volume can also be a physical copy of the data volume where a complete copy of the data volume is created on a different set of physical disks, also referred to as a clone.

Point-in-time copies of data are typically used in conjunction with high-availability systems to enable application availability and efficient system and data recovery. A point-in-time copy of data may be used to revert back to data at a previous satisfactory state to resolve a data error in the primary copy of data. System administrators manually restore the most recent point-in-time copies of data until a consistent point-in-time copy of data is restored without data integrity errors.

BRIEF SUMMARY

Embodiments of the invention relate to proactive detection of data inconsistencies in a storage system point-in-time copy of data. An aspect of the invention includes a method for proactive detection of a data inconsistency in a storage system point-in-time copy of data. The method includes receiving event information from systems and applications associated with point-in-time copies of data. The method further includes correlating each of a plurality of events of the event information with an at least one of the point-in-time copies of data. The method further includes determining whether an event is associated with a data inconsistency. An event is determined to be associated with a data inconsistency based on a probability that a data inconsistency has occurred with the occurrence of the event.

The method further includes identifying at least one point-in-time copies of data correlated with the event associated with the data inconsistency as a candidate point-in-time copy of data for testing to determine if the candidate point-in-time copy of data has a data inconsistency, if at least one of the events is associated with a data inconsistency. The method further includes selecting tests for testing the candidate point-in-time copy of data to determine if the candidate point-in-time copy of data has a data inconsistency.

Another aspect of the invention includes a system for proactive detection of a data inconsistency in a storage system point-in-time copy of data. The system includes a receiving module configured to receive event information from systems and applications associated with point-in-time copies of data. The system further includes an association module coupled to the receiving module. The association module is configured to correlate each of a plurality of events of the event information with at least one of point-in-time copies of data. The system further includes a determination module coupled to the association module. The determination module is configured to determine whether an event is associated with a data inconsistency. An event is determined to be associated with a data inconsistency based on a probability that a data inconsistency has occurred with the occurrence of the event.

The system further includes a selection module coupled to the determination module. The selection module is configured to identify at least one of the point-in-time copies of data correlated with at least one of the plurality of events as a candidate point-in-time copy of data for testing to determine if the candidate point-in-time copy of data has a data inconsistency, if the at least one of the events is associated with a data inconsistency. The system further includes a test module coupled to the selection module. The test module is configured to select tests for testing the candidate point-in-time copy of data to determine if the candidate point-in-time copy of data has a data inconsistency.

Another aspect of the invention includes a computer program product for proactive detection of a data inconsistency in a storage system point-in-time copy of data. The computer program product includes a computer readable storage medium having computer readable program code embodied therewith. The computer readable storage medium includes computer readable program code configured to receive event information from systems and applications associated with point-in-time copies of data. The computer readable storage medium further includes computer readable program code configured to correlate each of a plurality of events of the event information with an at least one of a plurality of point-in-time copies of data. The computer readable storage medium further includes computer readable program code configured to determine whether an event is associated with a data inconsistency. An event is determined to be associated with a data inconsistency based on a probability that a data inconsistency has occurred with the occurrence of the event.

The computer readable storage medium further includes computer readable program code configured to identify at least one of the point-in-time copies of data correlated with at least one of the of events as a candidate point-in-time copy of data for testing to determine if the candidate point-in-time copy of data has a data inconsistency, if the at least one of the plurality of events is associated with a data inconsistency. The computer readable storage medium further includes computer readable program code configured to select a plurality of tests for testing the candidate point-in-time copy of data to determine if the candidate point-in-time copy of data has a data inconsistency.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE SEVERAL VIEWS OF THE DRAWINGS

These and other features, aspects, and advantages of the present invention are better understood when the following Detailed Description is read with reference to the accompanying drawings, wherein.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for file management in a shared file system. While the following description will be described in terms of such languages for clarity and placing the invention in context, it should be kept in mind that the teachings herein may have broad application to all types of systems, devices and applications.

Embodiments of the invention relate to proactive detection of data inconsistencies in a storage system point-in-time copy of data. Consistency of data is a primary consideration for selecting a point-in-time copy of data, also known as a snapshot, for the purpose of restore. A data inconsistency includes various data errors which can cause data corruption and other problems when accessing or restoring an inconsistent copy of data.

The framework provides for automatic selection of prime candidate point-in-time copies of data for testing. A candidate point-in-time copy of data is selected for testing based on an association with a suspicious event in system and application event information and a probability that the suspicious event correlates to a data inconsistency.

The framework incorporates probability functionalities to guide the selection of test utilities for testing a candidate point-in-time copy of data. The test utilities are selected based on a probability that each test will detect a data inconsistency based on the correlation with the suspicious event. The testing of the candidate point-in-time with each of the test utilities selected is prioritized and scheduled based on an estimated run time of the test utilities and a pre-determined recovery time for having a consistent point-in-time copy of data available for restore. The candidate point-in-time copy of data is replicated and tested by test servers using the selected test utilities. The output of the test results indicates whether the point-in-time copy of data has an inconsistency.

Figure 1:
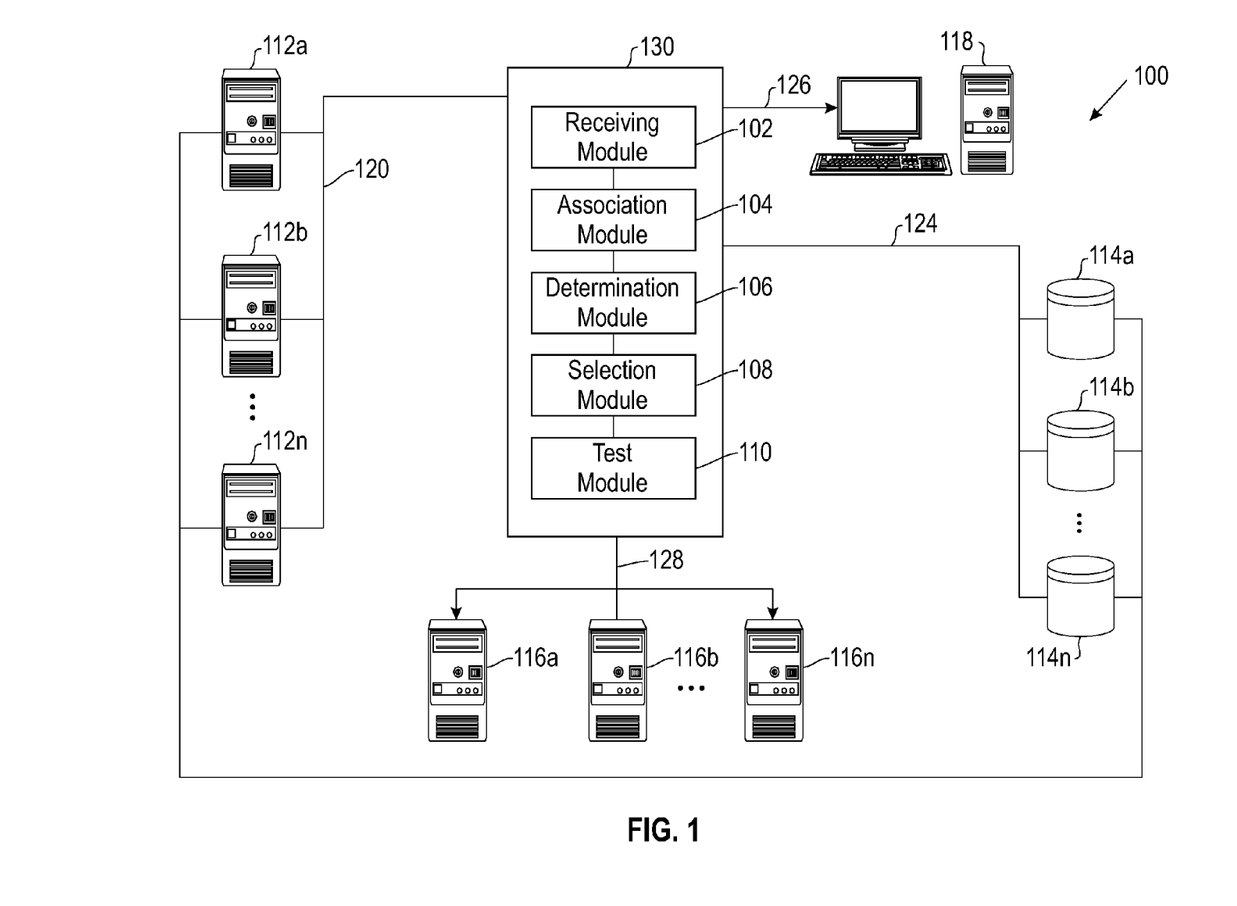
FIG. 1 illustrates system architecture for proactive detection of data inconsistencies in a storage system point-in-time copy of data, according to one embodiment.

FIG. 1 illustrates system architecture 100 for proactive detection of a data inconsistency in a storage system point-in-time copy of data, according to one embodiment. The system 100 includes a computing node 130 for embodying software modules for implementing the proactive detection of a data inconsistency in a storage system point-in-time copy of data. The computing node 130 is a stand-alone server, according to the preferred embodiment.

The computing node 130 includes a receiving module 102. The computing node 130 further includes an association module 104 coupled to the receiving module 102. The computing node 130 further includes a determination module 106 coupled to the association module 106. The computing node 130 further includes a selection module 108 coupled to the determination module 106. The computing node 130 further includes a test module 110 coupled to the selection module 108.

The receiving module 102 is configured to receive event information from a plurality of systems and applications associated with a plurality of point-in-time copies of data. The association module 104 is configured to correlate each of a plurality of events of the event information with an at least one of a plurality of point-in-time copies of data. The determination module 106 is configured to determine whether an event is associated with a data inconsistency. The event is determined to be associated with a data inconsistency based on a probability that a data inconsistency has occurred with the occurrence of the event. The probability that a data inconsistency has occurred with the occurrence of the event is based on an association of the event with a previously encountered data inconsistency.

The selection module 108 is configured to identify at least one of the plurality of point-in-time copies of data correlated with at least one of the plurality of events as a candidate point-in-time copy of data for testing to determine if the candidate point-in-time copy of data has, a data inconsistency, if the at least one of the plurality of events is associated with a data inconsistency. The test module 110 is configured to select a plurality of tests for testing the candidate point-in-time copy of data to determine if the candidate point-in-time copy of data has a data inconsistency.

The system 100 further includes a plurality of server nodes 112a, 112b . . . 112n. While three server nodes are illustrated, the server nodes may comprise 1 to "n" number of server nodes, where "n" equals any desired number of server nodes. The server nodes 112a, 112b . . . 112n are coupled to the computing node 102. The server nodes 112a, 112b . . . 112n are coupled to the computing node 102 over a local area network 102, according to the preferred embodiment. The server nodes 112a, 112b . . . 112n may be coupled to the computing node 102 over a wide area network, according to one embodiment.

The system 100 may include server nodes 112a, 112b . . . 112n of various types and purposes. The server nodes 112a, 112b . . . 112n include application servers to host software applications, according to the preferred embodiment. The server nodes 112a, 112b . . . 112n may further include file servers to host shared data, according to one embodiment. The server nodes 112a, 112b . . . 112n may further include database servers to host the processing of databases, according to one embodiment. The server nodes 112a, 112b . . . 112n may further include mail servers to host the processing of email services, according to one embodiment. The server nodes 112a, 112b . . . 112n may include various hardware architectures and configurations.

The system 100 further includes a plurality of storage nodes 114a, 114b . . . 114n. While three storage nodes 114a, 114b . . . 114n are illustrated, the storage nodes may comprise 1 to "n" number of storage nodes, where "n" equals any desired number of storage nodes. The storage nodes 114a, 114b . . . 114n are coupled to the server nodes 112a, 112b . . . 112n over a fiber channel network 122, according to the preferred embodiment. The storage nodes 114a, 114b . . . 114n may be coupled to the server nodes 112a, 112b . . . 112n over a local area network 122, according to one embodiment. The storage nodes 114a, 114b . . . 114n may be coupled to the server nodes 112a, 112b . . . 112n over a wide area network 122, according to one embodiment. The storage nodes 114a, 114b . . . 114n are coupled to the computing node 102 over a local area network 124, according to the preferred embodiment. The storage nodes 114a, 114b . . . 114n can be coupled to the computing node 102 over a wide area network 124, according to one embodiment.

The storage nodes 114a, 114b . . . 114n include Network Attached Storage (NAS) devices, a hard disk drive storage device connected to other devices over network 122, according to the preferred embodiment. The storage repositories 114a, 114b . . . 114n can include Storage Area Network (SAN) devices, a locally attached computer storage device such as disk arrays, according to one embodiment.

The system 100 further includes a client computing node 118. The client computing node is coupled to the computing node 102 over a local area network 126, according to the preferred embodiment. The client computing node may be coupled to the computing node 102 over a wide area network 126, according to one embodiment. The client computing node 118 is configured to provide user interface, remote access, and management to the computing node 102 for testing a point-in-time copy of data.

The system 100 further includes test nodes 116a, 116b . . . 116n. While three test nodes 116a, 116b . . . 116n are illustrated, the test nodes may comprise 1 to "n" number of test nodes, where "n" equals any desired number of test nodes. The test nodes 116a, 116b . . . 116n are coupled to the computing node 102 over a local area network 128, according to the preferred embodiment. The test nodes 116a, 116b . . . 116n may be coupled to the computing node 102 over a wide area network 128, according to one embodiment.

The test nodes 116a, 116b . . . 116n are configured to receive testing instructions from the test module 110 to test the point-in-time copy of data. The test module 110 initiates the testing of the point-in-time copy of data by providing the test nodes 116a, 116b . . . 116n with testing instructions and access to the point-in-time copy of data, according to the preferred embodiment. The test nodes 116a, 116b . . . 116n are further configured to provide the test results to the test module 110 upon completion of a test of a point-in-time copy of data.

Figure 2:
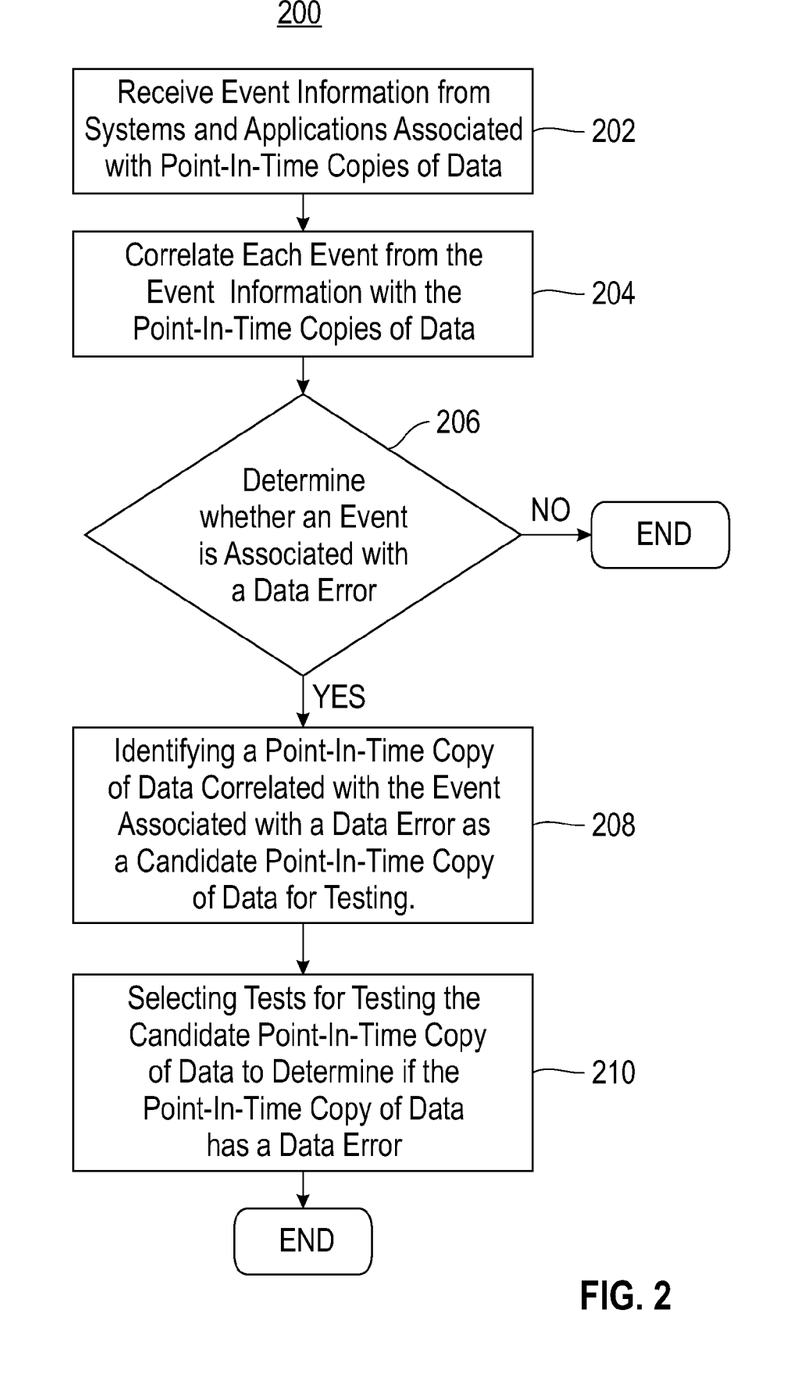
FIG. 2 illustrates a flow diagram of a method for proactive detection of data inconsistency in a point-in-time copy of data, according to one embodiment.

FIG. 2 illustrates a method 200 for testing a point-in-time copy of data, according to one embodiment. The receiving module 102 receives event information from a plurality of systems and applications associated with a plurality of point-in-time copies of data (step 202). The association module 104 correlates each of a plurality of events of the event information with an at least one of a plurality of point-in-time copies of data (step 204). The determination module 106 determines whether an event is associated with a data inconsistency (step 206). An event is determined to be associated with a data inconsistency based on a probability that a data inconsistency has occurred with the occurrence of the event. The method 200 ends if an event is not associated with a data inconsistency. The method 200 proceeds to step 208 if an event is associated with a data inconsistency.

The selection module 108 identifies at least one of the plurality of point-in-time copies of data correlated with at least one of the plurality of events as a candidate point-in-time copy of data for testing (step 208). The test module 110 selects a plurality of tests for testing the candidate point-in-time copy of data to determine if the candidate point-in-time copy of data has a data inconsistency, if at least one of the plurality of events is associated with a data inconsistency (step 210).

The receiving module 104 receives system and application event information from system and applications associated with point-in-time copies of data. The framework makes use of event logs at multiple levels of the storage stack. The event information includes information from events and environment variables that in combination may imply a problem with data in a system. The event information includes storage controller event information, file system event information, database event information, application event information, operating system event information, and networking event information, according to the preferred embodiment.

The event information may be comprised in system and application event logs from multiple levels of system 100 and parsed by the receiving module 104. Event logs have semi-structured data with a standardized format. For example, a storage system event log may have different data messages. The semi-structured event information may be parsed into a plurality of fields. For example, Table 1 is a representation of parsed event information from event logs. EventID is a unique identifier of an event within a particular tier. EventCompID is an identifier of a component. Timestamp is the synchronized or normalized time when the event occurred. Entity is a logical or physical entity defined in the event. Event Category is an event categorization and may include the following event categorizations: Application Error, Media Error, and/or Configuration Error. Critical Level denotes an importance of the event information, which may include: Major, Minor, Information, and/or Debug. Global Event Frequency is the number of times the event has occurred for any entity.

TABLE 1

Representation of Logged Event Information

| EventID | Event ComID | Timestamp | Entity | Event Category | Critical Level | Global Event Frequency |
|---|---|---|---|---|---|---|
| CACHE_ERROR | Stg Controller | 03:14 Oct. 22, 2008 | Storage System | Media Error | Major | 1 |

Event information is correlated with data error symptoms to guide the test module 110 with the selection of tests for testing the point-in-time copies of data. Domain knowledge is used to correlate event information with data error symptoms. Events represent important exceptions reported at specific points in time. Spatial Correlation and Temporal Correlation, characterize an event of the event information. Spatial Correlation correlates events to the entity or entitles the event is associated with. Temporal Correlation relates to conditional time dependency characteristics of each event.

Correlating of each of the plurality of events of the event information with an at least one of a plurality of point-in-time copies of data includes associating each of the plurality of events of the event information with at least one of the plurality of point-in-time copies of data based on a system the event information and the point-in-time copy of data are related to. Correlating of each of the plurality of events of the event information with an at least one of a plurality of point-in-time copies of data further includes associating each of the plurality of events of the event information with at least one of the plurality of point-in-time copies of data based on an application the event information and the point-in-time copy of data are related to. Correlating of each of the plurality of events of the event information with an at least one of a plurality of point-in-time copies of data further includes associating each of the plurality of events of the event information with at least one of the plurality of point-in-time copies of data based on a time an event in the event information occurred and a time the point-in-time copy of data was taken.

Distinguishing events into causes and corresponding symptoms provides a region-of-influence (RoI) abstraction. The region-of-influence captures the time range across which an event or set of events have an impact on a system. Consequently, an event is set to affect all copies in its region-of-influence. The region-of-influence abstraction is used to do the first level of association between events and point-in-time copies of data. Region-of-influence applies to both events and results of test runs/tasks.

A time-decay-function (TDF) provides another level of abstraction which helps associate additional factors such that each point-in-time copy in region-of-influence is impacted differently. Events are associated with different point-in-time copies of data and corresponding event sets are created using the time-decay-function and region-of-influence abstraction.

Table 2 illustrates system parameters used by the computing node 102 for testing a point-in-time copy of data.

TABLE 2

System Parameters

| Parameter | Description |
|---|---|
| PiT | A Point-In-Time copy of data |
| Ti | Test Utility i |
| $ES_j$ | A set j of events is associated with a specific PiT |
| $P(ES_j)$ | Probability that set j of events is associated with a specific PiT |
| $P(T_i/err_k)$ | Probability that a run of Test Utility ($T_i$) on a PiT will detect an error given that the PiT has $err_k$ |
| $P(err_k/ES_j)$ | Probability that an error k exists in a particular PiT given that event set i is associated with the PiT |
| $P(T_i/ES_j)$ | Probability that a run of Test Utility ($T_i$) on any PiT will detect error given that the event set j is associated with the PiT |
| EDP: $P_{PiT}(T_i)$ | Probability that a run of Test Utility ($T_i$) on any PiT will detect an Error |
| $RoI_{Eventk}$ | Time Range within which the Event k is of interest |
| $TDF_{Eventk}$ | Variation of Impact of Event k on different PiTs within its Region of Influence |
| $P(DL/ES_j)$ | Probability of Data Loss given event set j is observed |
| $Utility_{PiT}(T_i)$ | Utility of running Test i on a given PiT |

Table 3 shows the events of interest and their respective region-of-influence and time-decat-function, in a dependency matrix. The entity M(i,j)=1(0.6) provides that $Event_j$ appears in the existence of Error; and the event has a weight of 0.6 when matching; the value 0(0.06) means $Event_j$ does not appear. M(i,j)=* provides that $Event_j$ appears or not does not matter in the existence of $Error_i$. The event set for an error can be represented by a vector. For instance, <1(0.1), 1(0.1), 0(0.1), 0(0.7), *, . . . , * > represents an event set, which can also be seen as a signature, for Error "Journal/Data Inconsistency."

TABLE 3

Event-Region of Influence

| Event | Region of Influence (RoI) | Time Decay Function (TDF) |
|---|---|---|
| $E_1$ | {Previous $T_1$-Next $T_1$} | Exponential |
| $E_2$ | {Previous $T_2$-Next $T_2$} | Linear |
| $E_3$ | {Previous Clone-Next $T_4$} | Linear |
| $E_4$ | {Previous $T_4$-Next $T_4$} | Always 1 |
| $E_5$ | {Previous $T_5$-Next $T_6$} | Linear |

Probability that an error k exists in a particular PiT given that event set $ES_j$, represented by a vector vj, is associated with the PiT, needs to be computed $P(err_k|ES_j)$. The probability equation computes a distance of $v_j$ to each error signature Mi (i.e., the ith row in matrix M); denote the distance as di. The probability equation converts the distance values into a probability distribution over the error space. A way is to assign 1 to the nearest signature and its corresponding error and 0 to other errors. Another way to convert a vector of distance values $<v_1, \ldots, v_n>$ into a probability distribution is through formula:

$$P(err_i | ES_j) = \frac{\exp(A * v_i + B)}{\sum_j \exp(A * v_j + B)},$$

where parameters A and B can be determined based on the dependency matrix by maximizing the log probability of an error given its associated event set.

The test module 110 is selects a plurality of tests for testing the candidate point-in-time copy of data to determine if the candidate point-in-time copy of data has a data inconsistency, if at least one of the plurality of events is associated with a data inconsistency. Each of the plurality of tests for testing the candidate point-in-time copy of data are selected by the test module 110 based on a correlation between the event associated with the data inconsistency and a probability that each of the plurality of tests will detect the data inconsistency.

The point-in-time copies are classified into different corruption classes based on an association with information in a knowledge repository of common events. The event information is compared to the knowledge repository and is associated with corruption classes and corresponding test utilities. Knowledge repository is based on commonly seen corruption events and previously seen errors.

Consistency of data of a point-in-time copy of data is dependant on consistency from different layers of the software stack. Consistency of data includes storage controller, also known as RAID level consistency. RAID level consistency is tested with parity verification and sector checksum verification done by disk scrubbing tools. Consistency of data also includes file system level consistency. The file system consistency which includes free block list and inode consistency may be tested by tools such as FSCK. Consistency of data further includes database level consistency which may be tested with a page level checksum verification and referential integrity checked by DB Tools (eseutil, insutil, dbverify). Consistency of data further includes application level consistency.

The test module 110 identifies the test utilities that need to be run on the point-in-time copies of data identified by the selection module 108. Each of the plurality of tests for testing the candidate point-in-time copy of data are selected based on a correlation between the event associated with the data inconsistency and a probability that each of the plurality of tests will detect the data inconsistency. The appropriate test utilities must be determined because different test utilities have different priorities and resources states. Determining a plurality of tests for testing the point-in-time copy of data is based on criteria including a test's resource consumption and a test's error detection probability. Determining a plurality of tests for testing the point-in-time copy of data includes comparing the extracted event information with a plurality of error classes corresponding to a plurality of previously identified errors.

Error Detection Probability (EDP) for a Test Task is defined as: $<PiT, T_i>$ as probability that a run of Test Utility $T_i$ for point-in-time copy PiT detects an error. Error Detection Probability is computed as follows:

$$EDP: P_{PiT}(T_i) = \sum_{ES_j in S} P(T_i | ES_j) P(ES_j)$$

S represents the space of possible event sets that can be associated with the PiT. $P(ES_j)$ denotes the probability that the event set $ES_j$ is associated with the PiT. $P(T_i|ES_j)$ is the conditional probability that $T_i$ will detect a corruption in the PiT given that $ES_j$ has been associated with the PiT.

In reference to the two probability values $P(T_i|ES_j)$ and $P(ES_j)$, $err_k$ denotes the kth error type. Under an assumption that only one type of error can happen at any point-in-time, the $P(T_i|ES_j)$ can be written as:

$$P(T_i | ES_j) = \sum_k P(T_i | err_k \text{ and } ES_j) P(err_k | ES_j)$$

$$= \sum_k P(T_i | err_k) P(err_k | ES_j)$$

$$P_{PiT_k}(T_i) = \sum_{ES_j in S_k} \left[ \sum_k P(T_i | err_k) P(err_k | ES_j) \right] * P(ES_j)$$

Different errors have different severity levels or potential for data loss and/or corruption. The test module 110 is configured to incorporate data loss probabilities. The data loss probabilities are defined as:

$$U_{PiT} = \sum_{ES_j in S} \left[ \sum_k P(T_i | err_k) P(err_k | ES_j) \right] * P(ES_j) * P(DL | ES_j)$$

Each test utility is designed for a specific purpose and consequently detects a specific set of data consistency issues. There exists a correlation between test utilities, errors, and events. $P(T_i|err_k)$ can be defined by administrators familiar with a specific Test Utility. For example, the probability the run of FSCK with -c option detects all bad blocks in the point-in-time copy which are close to 1.

Table 4 describes the test utilities which may be selected by the test module 110. For example, the computation of the probability distribution of errors for PiT 4 is considered. The result is $P(err_1)=0.5$ and $P(err_2)=0.5$, which means PiT 4 is very likely to be corrupted. Here, $err_1$ denotes Journal/Data inconsistency and $err_2$ denotes Inode/Data inconsistency in the file system. PiT 5 will similarly have a high suspicious score. The later point-in-time copies will have lower scores because of the time-decay-function. As events E1, E2, and E3 are all associated with PiT 4, PiT 4 has a corruption expectation. $T_4$ does not detect any error on PiT 4 because, in reality, no corruption happened. $E_4$ gets associated with PiT 4, 5, and others which are in its RoI. The suspicious scores for PiT 4 and 5 drop after E4 gets associated. For example, P(No_Error)=0.9 for PiT5 is not corrupted given that $T_4$ found no error in PiT 4.

TABLE 4

Test Utilities

| Test | Command | Description |
|---|---|---|
| $T_1$ | FSCK-n | Journal/Data inconsistency check |
| $T_2$ | FSCK-n-f | Inode/Data inconsistency check |
| $T_3$ | FSCK-n-c | Bad blocks check |
| $T_4$ | FSCK-A | Perform all filesystem checks |
| $T_5$ | PGCheck Page | Check all database table pages for consistency |
| $T_6$ | PGCheck Index | Check all database index pages for consistency |

Table 5 illustrates test utility mapping for correlating events and errors using a dependency matrix M.

TABLE 5

Event Descriptions

| Error/Test Utilities | $T_1$ | $T_2$ | $T_3$ | $T_4$ | $T_5$ | $T_6$ |
|---|---|---|---|---|---|---|
| Journal/Data Inconsistency | Yes | Yes | Yes | Yes | | |
| Inode/Data mapping Inconsistency | | Yes | | Yes | | |
| Bad Blocks | | | Yes | Yes | | |
| DB Page Checksum Error | | | | | Yes | Yes |
| DB IO Timeout | | Yes | Yes | Yes | Yes | Yes |

User defined objectives are used by the test module 110 to determine the priority of each test utility. For example, if a user defined objective is to find the most recent unaffected point-in-time copy of data, more weight-age would be given to tasks pertaining to a more recent point-in-time copy, where as if objective was determining of root cause, the weight-age would be different.

The test module 110 incorporates feedback of test utilities based on results of previous tests. The test module 110 incorporates feedback of test utilities results based on a test results and definitions of associated probabilities. For example, if a full run of FSCK on a point-in-time copy of data finds no errors, then related tests (fsck journal verify, pgcheck page verifcation) of nearby copies should be given lesser priority as the EDP of these copies goes down.

Event information may be an indicator of one or more error conditions. $P(err_k, ES_j)$ captures the probability that an error of type $err_k$ has occurred or will occur given that event set $ES_j$ has been observed. Determining the probability for different error/event combinations may be done by a system administrator(s). The system 100 provides a simple extensible framework for incorporating domain specific knowledge.

Test utilities used to test for data inconsistencies operate at block-levels and application-levels. Block-level tests, such as disk scrubbing read the disk sectors, calculate the checksum and verify. File-level tests, such as fsck have invocation options to verify journal, inode and data blocks. Application-level tests have invocation options to verify tablespace and index pages, index-to-data pointers, column data, and referential integrity (RI) constraints.

An error at a lower level (such as block or file) does not necessarily translate into an error at a higher (application) level. For example, an application may not be using error blocks, the error blocks may have been corrected by a storage controller internally using RAID redundancy, or the error blocks may have been overwritten before the application used them. However, an error in lower level typically implies a higher probability of having an error at the higher level.

Non-temporal relation for a point-in-time copy of data refers to the observation that no errors found for a copy at a time, $t_m$, does not imply that all copies before $t_m$ are all correct as well. The errors occurred in point-in-time copies before $t_m$ could be self-corrected (e.g. overwritten by correct data) such that copy at $t_m$ is correct. Also, the point-in-time copies before $t_m$ may share the physical blocks which have media errors, but copy at $t_m$ does not share those blocks. Therefore, creating clones is necessary to alleviate the non-temporal relation caused by media errors, by creating another physical copy of the data to reduce the number of snapshots sharing the same physical blocks, and thus limit the media error impact only to those sharing snapshots. Creating clones is infrequent compared to snapshots and typically done by a storage controller in background.

Testing the point-in-time copy of data includes the test module 110 replicating the point-in-time copy of data identified by the selection module 108 to test the replicated point-in-time copy of data, according to the preferred embodiment. A storage controller of server nodes 112a, 112b ... 112n will periodically take application consistent point-in-time copies or clones for corresponding storage volumes. A storage controller of the computing node 102 will use its in-built functionality to create a new copy of the to-be-tested copy and make this new copy writable. The test module 110 would initiate the creation of a copy of the point-in-time copy of data on a storage controller and provide access to the copy to the test modules 116a, 116b ... 116n for testing.

Testing the point-in-time copy of data includes setting the copy of the point-in-time copy to a writable state on the storage controller, according to the preferred embodiment. The test module 110 sets the copy of the point-in-time copy of data to a writeable state on a storage controller of computing node 102 for testing by one or more of the test nodes 116a, 116b ... 116n.

The test module 110 then maps the copy of the point-in-time copy of data on the storage controller of the test node(s) 116a, 116b ... 116n which will test the point-in-time copy of data, according to the preferred embodiment. The test module 110 then discovers a new logical unit number (LUN) on the test node(s) 116a, 116b ... 116n which will test the point-in-time copy of data. A LUN to Small Computer System Interface (SCSI) device mapping on the test node 116a, 116b ... 116n is determined by the test module 110. The test module 110 further crease a SCSI device to UNIX device mapping on the test node(s) 116a, 116b ... 116n which will test the point-in-time copy of data. As a result, the volumes in the writable copy will be mapped and mounted to the test node(s) 116a, 116b ... 116n which will test the point-in-time copy of data.

Testing further includes mounting the SCSI device on the test node(s) 116a, 116b ... 116n which will test the point-in-time copy of data. The plurality of tests is then run on SCSI device mounted on the test node(s) 116a, 116b ... 116n which will test the point-in-time copy of data. Data volumes will be un-mounted, the mapping will be deleted, and the writable snapshot can be deleted if no further testing on the snapshot is needed, after the writable copy is tested.

For example, new_test_snapshot=snapshot duplicate (candidate_snapshot), creates a snapshot of the candidate snapshot. vol_unlock(new_test_snapshot) makes the test snapshot writeable. map_vol(new_test_snapshot, test_machine, desired_lun_number), maps the test snapshot to the testing module 110. rescan scsi bus/hba to discover new lun (rescaning hba is usually done using scripts provided by hba vendors). sg_scan -i (gives the scsi dev name for lun under question), performs scan to determine LUN to SCSI device name for LUN under question. sg_map (eg:/dev/sg*=/dev/sd*), performs mapping to determine SCSI device to UNIX device name mapping. mount/dev/sd*/mnt/mount_point, mounts the device.

The test nodes 116a, 116b ... 116n only carry out the test instructions provided by the test module 110, according to the preferred embodiment. The test results are accessed and processed by the test module 110 to determine whether the point-in-time copy of data has at least one data inconsistency.

The test module 110 is configured to handle silent error information. Silent errors have information that does not exhibit any specific observable event or problem. These errors can be detected by performing actual data access (Or by running test utilities that do data access). Modification to the way the EDP for test task is computed to handle silent errors. The modified EDP can be defined as:

$$EDP: P_{PiT}(T_i) = \left[ \sum_{ES_j in S} (P(T_i | ES_j) P(ES_j)) \right] + TD(T_i),$$

where $TD(T_i)$ is Test Decay defined as a function of time since the last run of test Utility $T_i$.

Table 6 illustrates the association of event information with a plurality of point-in-time copies of data.

TABLE 6

| Event-PiT Assocations | |
|---|---|
| Point-in-time Copy | Associated Events |
| 1 | |
| 2 | E1(0.7), E2(0.7) |
| 3 | E1(0.9), E2(0.9), E3(0.9) |
| 4 | E1(0.9), E2(0.9), E3(0.9) |
| 5 | E1(0.9), E2(0.7), E3(0.7) |
| 6 | E1(0.7), E2(0.5), E3(0.5) |
| 7 | E1(0.3), E2(0.3), E3(0.3) |

Figure 3:
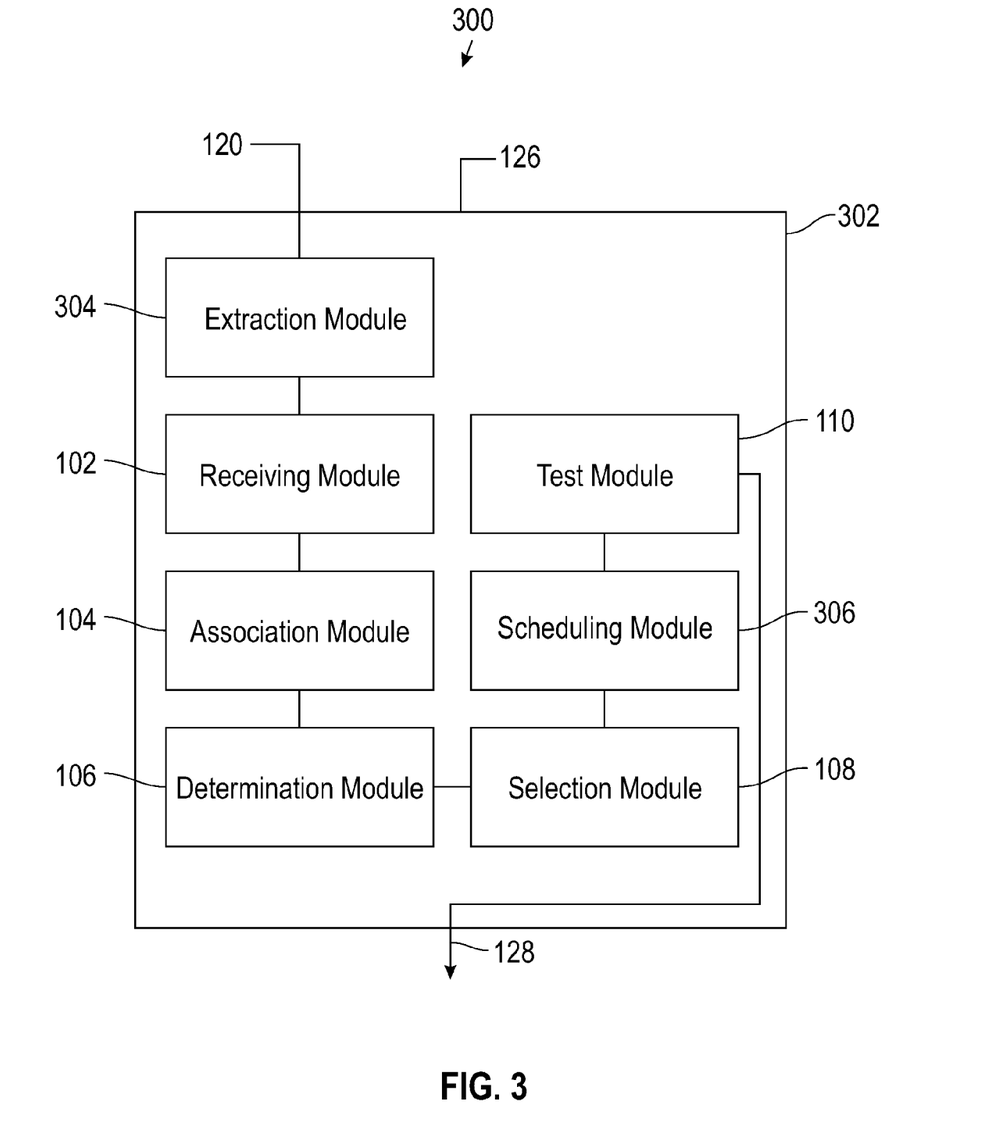
FIG. 3 illustrates a system for proactive detection of data inconsistency in a point-in-time copy of data, according to the preferred embodiment.

FIG. 3 illustrates a system 300 proactive detection of a data inconsistency in a point-in-time copy of data, according to the preferred embodiment. The system 300 includes a computing node 302 for embodying software modules used for proactive detection of a data inconsistency in a point-in-time copy of data. The computing node 302 includes an extraction module 304. The extraction module 304 is coupled to the receiving module 102. The receiving module 102 is coupled to the association module 104. The association module 104 is coupled to the determination module 106. The selection module 108 is coupled to the determination module 106. The system further includes a scheduling module 306. The selection module 306 is coupled to the selection module 108. The test module 110 is coupled to the scheduling module 306.

The extraction module 304 is configured to extracting the event information from the plurality of systems and applications associated with the plurality of point-in-time copies of data. The extraction module 304 initiates the extraction of event information from server nodes 112a, 112b . . . 112n, applications associated with server nodes 112a, 112b . . . 112n, storage nodes 114a, 114b . . . 114n, and servers associated with server nodes 112a, 112b . . . 112n. The extraction module 302 is coupled to the receiving module 102 within the system 300, according to the preferred embodiment. The extraction module 304 may also reside on a separate computing node within a local area network or a wide area network, according to one embodiment. The extraction module 302 may also reside on a server(s) of server nodes 112a, 112b . . . 112n, according to one embodiment.

The scheduling module 306 is configured to schedule the plurality of tests selected for testing the candidate point-in-time copy of data. The scheduling module 306 prioritizes each of the plurality of tests selected for testing the candidate point-in-time copy of data each based on an estimated run time of each of the plurality of tests selected for testing the candidate point-in-time copy of data. Each test utility varies in their run-times, IO and CPU requirements, and the types of errors that can be caught by running the particular test. A typical consistency test has a runtime of the order of hours (DB2 Check for a 1 TB database takes 9 hours). The scheduling orchestration needs to further consider the impact of the tests on production application and systems when scheduling a candidate point-in-time copy of data for testing. Therefore, the scheduling module 306 needs to intelligently decide when each candidate point-in-time copy of data is tested and when each test utility selected by the test module 110 will be run.

The scheduling module 306 analyzes an availability of a plurality of resources for testing the point-in-time copy of data with the plurality of tests, according to one embodiment. The scheduling module 306 determines an order and scheduling of the plurality of tests. Scheduling the plurality of tests for testing the point-in-time copy of data is done by analyzing a recovery time objective (RTO) and a recovery point objective (RPO) of the point-in-time copy of data, according to preferred embodiment. The scheduling module 306 uses resource models of various test utilities and the size of the datasets to estimate approximate runtimes of various tests. The output of the scheduling by the scheduling module 306 is a schedule of tests, an estimate RPO, and test configuration replication instructions for the test nodes 116a, 116b . . . 116n to carry out the testing of the point-in-time copy of data.

Figure 4:
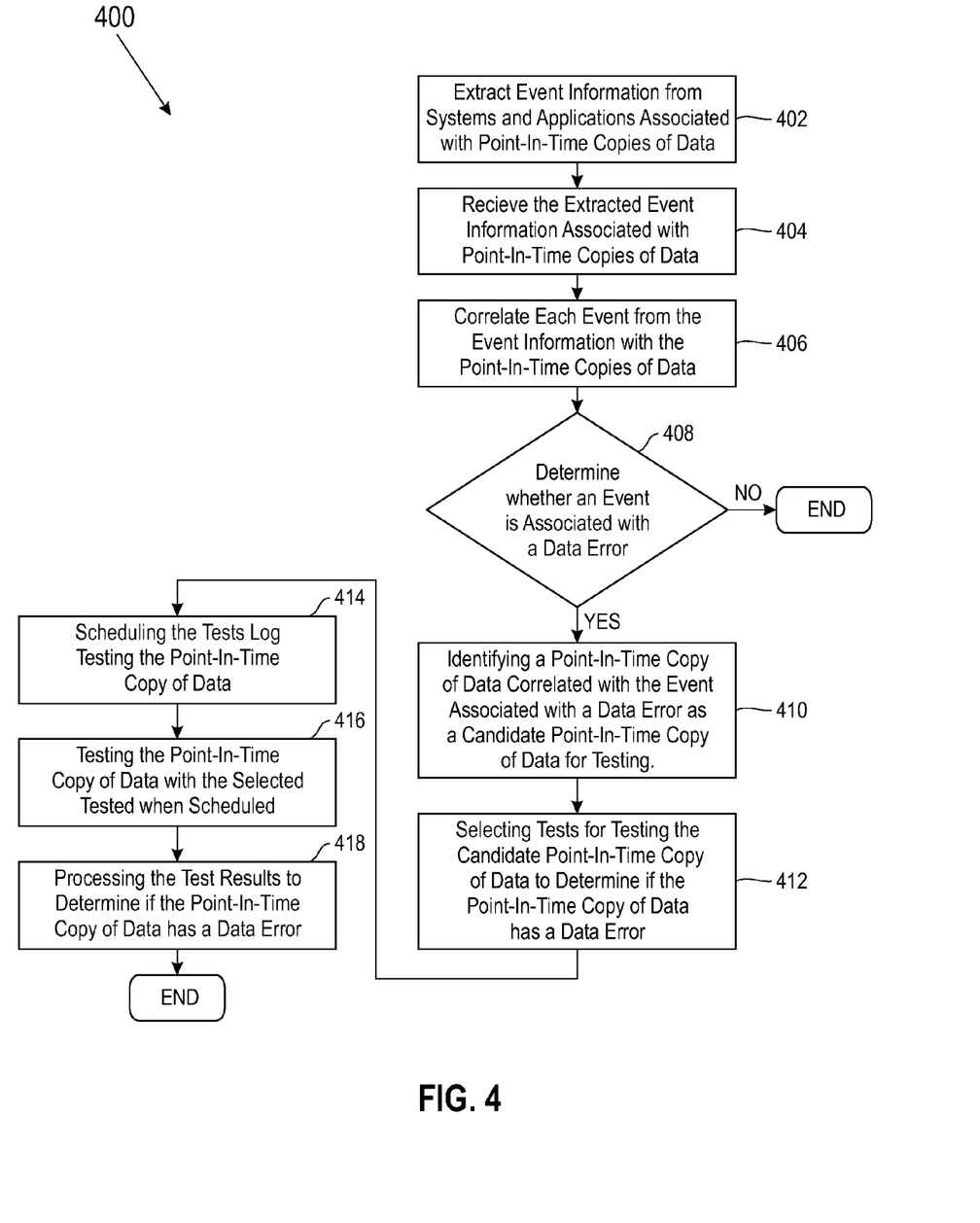
FIG. 4 illustrates a flow diagram of a method for proactive detection of a data inconsistency in a point-in-time copy of data, according to the preferred embodiment.

FIG. 4 illustrates a flow diagram of a method 400 for proactive detection of a data inconsistency in a point-in-time copy of data, according to the preferred embodiment. The extraction module 304 extracts event information from a plurality of systems and applications associated with point-in-time copies of data (step 402). The receiving module 102 receives the event information from the plurality of systems and applications associated with a plurality of point-in-time copies of data (step 404). The association module 104 correlates each of a plurality of events of the event information with an at least one of a plurality of point-in-time copies of data (step 406). The determination module 106 determines whether an event is associated with a data inconsistency. (step 408). An event is determined to be associated with a data inconsistency based on a probability that a data inconsistency has occurred with the occurrence of the event. The method 400 ends if an event is not associated with a data inconsistency. The method 400 proceeds to step 410 if an event is associated with a data inconsistency.

The selection module 108 identifies at least one of the plurality of point-in-time copies of data correlated with at least one of the plurality of events as a candidate point-in-time copy of data for testing to determine if the candidate point-in-time copy of data has a data inconsistency (step 410). The test module 110 selects a plurality of tests for testing the candidate point-in-time copy of data to determine if the candidate point-in-time copy of data has a data inconsistency (step 412). The scheduling module 306 schedules the plurality of tests selected for testing the candidate point-in-time copy of data (step 414). The test module 110 initiates the testing of the candidate point-in-time copy of data (step 416) by test nodes 116a, 116b . . . 116n to determine if the candidate point-in-time copy of data has a data inconsistency. The test module 110 processes the test results to determine if the point-in-time copy of data has at least one inconsistency (step 416).

The test module 110 is further configured to determine whether subsequent testing is required to determine if the point-in-time copy of data has at least one data inconsistency. The test module 110 re-selects tests for testing the candidate point-in-time copy of data, if further testing is required to determine if the point-in-time copy of data has at least one data inconsistency. The test module 110 re-initiates testing by test nodes 116a, 116b . . . 116n to determine if the candidate point-in-time copy of data has a data inconsistency with the tests re-selected by the test module 110.

Figure 5:
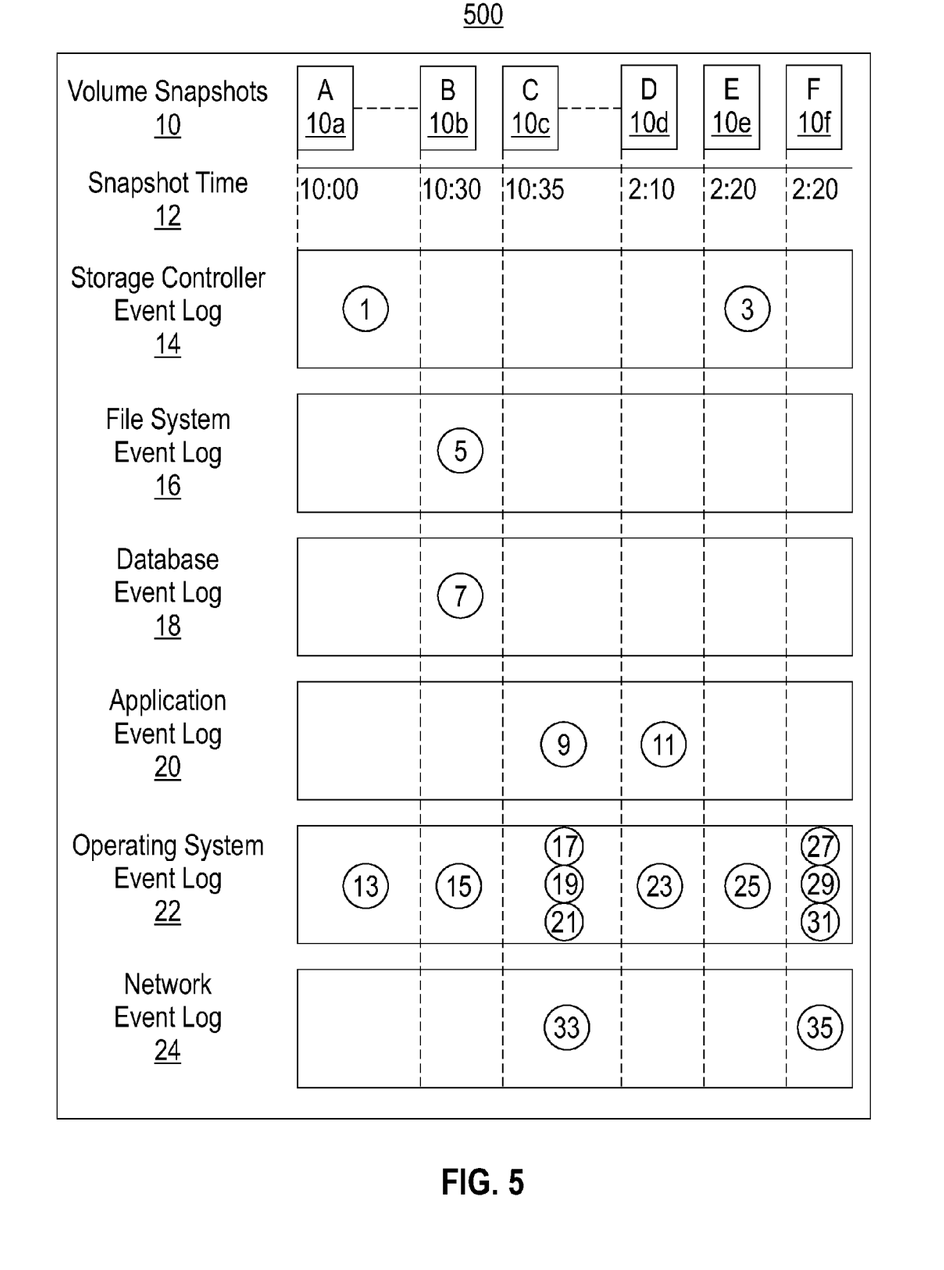
FIG. 5 illustrates a data structure for associating the system and application event information with point-in-time copies of data, according to one embodiment.

FIG. 5 illustrates a data structure 500 for associating the system and application event information with each point-in-time copy of data, according to one embodiment. Event information at multiple levels of the system stack is extracted to guide selection of candidate point-in-time copies of data for testing. The event information may extracted from a storage controller event log 14, a file system event log 16, a database event log 18, an application event log 20, an operating system event log 22, and a network event log 24.

Point-in-time copies of data, volume snapshots 10, are taken at different snapshot times 12. For example, volume snapshot 10a is taken at 10:00, volume snapshot 10b is taken at 10:30, volume snapshot 10c is taken at 10:35, volume snapshot 10d is taken at 2:10, volume snapshot 10e is taken at 2:20, and volume snapshot 10f is taken at 2:20.

Event information 102 is logged based on events which take place at different instances in time. For example, the storage controller event log 14 has event information 102 written for volume snapshot 10a, at 10:00 1, and volume snapshot 10e at 2:20 3. The file system event log 16 has event information 102 written for snapshot volume 10b at 10:30 5. The database event log 18 has event information 102 written for snapshot volume 10b at 10:30 7. The application event log 20 has event information 102 written for snapshot volume 10c at 10:35 9, and volume snapshot 10d at 2:10 11. The operating system event log 22 has event information 102 written for snapshot volume 10e at 2:20 25, and volume snapshot 10f at 2:20 27.

The test module 110 throttles the at least one of the plurality of tests testing the candidate point-in-time copy of data to reduce performance impact on the production application, if performance of a production application is below a pre-determined threshold. The test module 110 arbitrates between test tasks of different applications to ensure application priorities are followed and to ensure that it accounts for impact on production applications.

The scheduling module 110 implements a preemptive throttling based priority scheduling, as when test resources become free, the highest priority task is assigned to it. Execution of test tasks is strictly monitored and if performance of production applications falls below a specified threshold, the test module 110 minimizes the impact using a throttling framework that slows down the testing task. Throttling is accomplished by using a feedback driven adaptive module that constantly monitors performance of both the test utilities and the production applications. The test module 110 monitors a performance of a production application in response to testing the candidate point-in-time copy of data with the at least one of the plurality of tests.

The test module 110 processes the test results of test nodes 116a, 116b . . . 116n testing of a point-in-time copy of data. The test module 110 processes the test results to determine if the point-in-time copy of data has at least one data inconsistency. Tests can return positive results with no inconsistencies found, or report inconsistencies, or correct the inconsistencies and provide the verified point-in-time copy of data. The results need to be taken into account to modify the test task schedule accordingly and make the necessary priority changes.

Table 7 illustrates test results associated with a specific event.

TABLE 7

Event Descriptions

| Event | Summary of Event | Description of Test Results |
| --- | --- | --- |
| $E_1$ | Storage Node A Restarted | In Storage Node A some of the read/write operations failed to complete |
| $E_2$ | Storage Node B Cache Flush Error | Storage Node B cache contains a data inconsistency or error |
| $E_3$ | Disk/Media Access Error | Blocks from the media storage are inaccessible |
| $E_4$ | Test Utility $T_4$ Completion | Test Utility $T_4$ completed for PiT 4 and found no corruptions |
| E5 | Database Buffer Pool Overflow | Database buffer failed to complete an operation due to insufficient memore |

The test module 110 further determines if subsequent testing is required to determine if the point-in-time copy of data has at least one data inconsistency, according to preferred embodiment. A plurality of tests for re-testing the point-in-time copy of data is selected by the test module 110, if subsequent re-testing is required. The test module 110 re-tests the point-in-time copy of data with the new tests selected. The test module 110 then processes the new test results to determine if the point-in-time copy of data has at least one data inconsistency.

Figure 6:
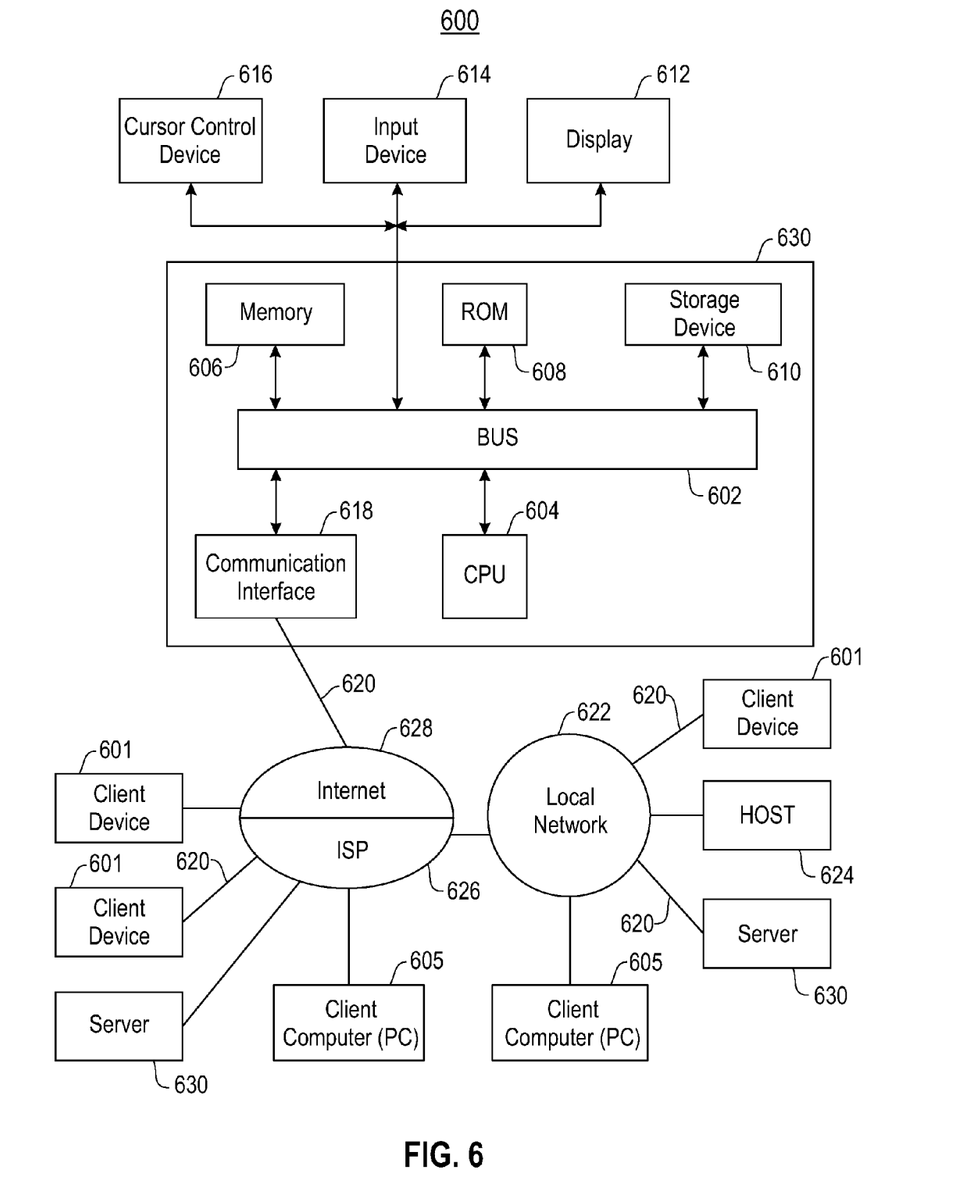
FIG. 6 illustrates computer architecture for implementing for proactive detection of data inconsistency in a point-in-time copy of data, according to one embodiment.

FIG. 6 illustrates computer architecture 600 for implementing testing of a point-in-time copy of data, according to one embodiment. The computer architecture 600 includes one or more client devices 601 connected to one or more server computing systems 630. A server 630 includes a bus 602 or other communication mechanisms for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604.

The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for traNFSerring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type of user input device comprises cursor control 616, such as a mouse, a trackball, or cursor direction keys for communicating direction information and command selections to the processor 104 and for controlling cursor movement on the display 612.

The functions of the invention are performed by the server 630 in response to the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP) 626. The ISP 626 in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise of a USB/Tuner and the network link 620 may be an antenna or cable for connecting the server 630 to a cable provider, satellite provider or other terrestrial transmission system for receiving messages, data and program code from another source.

The example versions of the invention described herein may be implemented as logical operations in a distributed processing system such as the computer architecture 600 including the servers 630. The logical operations of the present invention can be implemented as a sequence of steps executing in the server 630, and, as interconnected machine modules, within the computer architecture 600. The implementation is a matter of choice and can depend on performance of the computer architecture 600 implementing the invention: As such, the logical operations constituting said example versions of the invention are referred to for e.g. as operations, steps or modules.

Similar to a server 630 described above, a client device 601 can include a processor, memory, storage device, display, input device and communication interface (e.g., e-mail interface) for connecting the client device to the Internet 628, the ISP 626, or LAN 622, for communication with the servers 630.

The computer architecture 600 can further include computers (e.g., personal computers, computing nodes) 605 operating the same manner as client devices 601, wherein a user can utilize one or more computers 605 to manage data in the server 630.

Generally, the term "computer-readable medium", as used herein, refers to any medium that participated in providing instructions to the processor 604 for execution. Such a medium may take many forms, including but not limited to, non-volatile media, volatile media and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of detecting a data inconsistency in a point-in-time copy of data, comprising:
    receiving event information from systems and applications associated with a plurality of point-in-time copies of data, each of said copies being a data image of a storage volume's state at a particular time;
    correlating events from the event information with at least one said copies;
    determining that at least event is associated with a data inconsistency, said determining being based on a probability that there is a data inconsistency with the occurrence of a particular event where the probability is based on an association of the particular event with a previously encountered data inconsistency; and
    determining that at least one event is associated with a data inconsistency, including:
        identifying, at least one of said copies correlated with an event determined to be associated with a data inconsistency as a candidate point-in-time copy of data, for testing for a data inconsistency;
        selecting, particular tests for testing said candidate to determine whether said candidate has a data inconsistency, the selecting being based on a correlation between the event associated with the data inconsistency and a probability that each of the tests will detect the data inconsistency;
        scheduling testing of said candidate using said tests, the scheduling includes prioritizing each of the selected tests based on an estimated run time;
        testing said candidate with at least one of the tests selected to determine if said candidate has a data inconsistency;
        determining that the testing results with at least one data inconsistency, and correcting the at least one inconsistency and providing the corrected point-in-time copy of data;
        monitoring performance of the tests and a production application associated with said point-in-time copy of data; and
        if performance of the production application is below a pre-determined threshold, throttling the tests to reduce performance impact on the production application.

2. The method of claim 1, wherein said correlating includes associating each event from the event information with at least one of said copies, the associating being based on:

a particular system that the event information and a particular copy being tested (among said copies) are related to;
an application the event information and a particular copy being tested (among said copies) are related to; and
a time an event in the event information occurred and a time a particular copy being tested (among said copies) was taken.

3. The method of claim 1, further comprising:
extracting the event information from said systems and applications.

4. The method of claim 1, wherein the testing includes:
creating a copy of said candidate;
setting the copy of said candidate to a writable state;
mapping the copy of said candidate to a test node;
running said selected tests on said candidate using the test node; and
processing a result of said running while handling silent error information.

5. The system of claim 1, wherein said test includes creating a copy of said candidate; setting the copy of said candidate to a writable state; mapping the copy of said to a test node; running said selected tests on said candidate using the test node; and processing a result of said running while handling silent error information.

6. A system for detecting a data inconsistency in a point-in-time copy of data, comprising:
a computer-readable medium having computer program instructions; and
a processor executing the computer program instructions to:
receive event information from systems and applications associated with a plurality of point-in-time copies of data, each of said copies being a data image of a storage volume's state at a particular time;
correlate events from the event information with at least one said copies;
determine that at least event is associated with a data inconsistency, said determine being based on a probability that there is a data inconsistency with the occurrence of a particular event where the probability is based on an association of the particular event with a previously encountered data inconsistency; and
determine that at least one event is associated with a data inconsistency, including:
identify, at least one of said copies correlated with an event determined to be associated with a data inconsistency as a candidate point-in-time copy of data, for testing for a data inconsistency;
select, particular tests for testing said candidate to determine whether said candidate has a data inconsistency, the selecting being based on a correlation between the event associated with the data inconsistency and a probability that each of the tests will detect the data inconsistency;
schedule testing of said candidate using said tests, the scheduling includes prioritizing each of the selected tests based on an estimated run time;
test said candidate with at least one of the tests selected to determine if said candidate has a data inconsistency;
determine that the testing results with at least one data inconsistency, and correct the at least one data inconsistency and provide the corrected point-in-time copy of data;
monitor performance of the tests and a production application associated with said point-in-time copy of data; and
if performance of the production application is below a pre-determined threshold, the tests are throttled to reduce performance impact on the production application.

7. The system of claim 6, wherein said correlate includes associating each event from the event information with at least one of said copies, the associating being based on:
a particular system that the event information and a particular copy being tested (among said copies) are related to;
an application the event information and a particular copy being tested (among said copies) are related to; and
a time an event in the event information occurred and a time a particular copy being tested (among said copies) was taken.

8. A computer program product for detecting a data inconsistency in a point-in-time copy of data, the computer program product comprising a non-transitory computer readable storage medium having computer readable program code embodied therewith, said program code being executable by a processor to:
receive event information from systems and applications associated with a plurality of point-in-time copies of data, each of said copies being a data image of a storage volume's state at a particular time;
correlate each event from the event information with at least one said copies;
determine that at least event is associated with a data inconsistency, said determining by using probability that there is a data inconsistency with the occurrence of a particular event where the probability is based on an association of the particular event with a previously encountered data inconsistency; and
determine that at least one event is associated with a data inconsistency, including:
identify, at least one of said copies correlated with an event determined to be associated with a data inconsistency as a candidate point-in-time copy of data, for testing for a data inconsistency;
select, particular tests for testing said candidate to determine whether said candidate has a data inconsistency, the selecting being based on a correlation between the event associated with the data inconsistency and a probability that each of the tests will detect the data inconsistency;
schedule testing of said candidate using said tests, the scheduling includes prioritizing each of the selected tests based on an estimated run time;
test said candidate with at least one of the tests selected to determine if said candidate has a data inconsistency;
determine that the testing results with at least one data inconsistency, and correct the at least one inconsistency and provide the corrected point-in-time copy of data;
monitor performance of the tests and a production application associated with said point-in-time copy of data; and
if performance of the production application is below a pre-determined threshold, the tests are throttled to reduce performance impact on the production application.

9. The computer program product of claim 8, wherein said correlating includes associating each event from the event information with at least one of said copies, the associating being based on:
- a particular system that the event information and a particular copy being tested (among said copies) are related to;
- an application the event information and a particular copy being tested (among said copies) are related to; and
- a time an event in the event information occurred and a time a particular copy being tested (among said copies) was taken.

10. The computer program product of claim 8, wherein said test includes creating a copy of said candidate; setting the copy of said candidate to a writable state; mapping the copy of said to a test node; running said selected tests on said candidate using the test node; and processing a result of said running while handling silent error information.

\* \* \* \* \*